United States Patent
Proni et al.

(10) Patent No.: US 10,484,767 B1
(45) Date of Patent: Nov. 19, 2019

(54) LOUDSPEAKER SYSTEM WITH MULTI-COMPONENT GRILL ASSEMBLY

(71) Applicants: Lucio Proni, Weston, FL (US); Dwayne Spanbroek, Boca Raton, FL (US); Carlos A Gomez, Pembroke Pines, FL (US)

(72) Inventors: Lucio Proni, Weston, FL (US); Dwayne Spanbroek, Boca Raton, FL (US); Carlos A Gomez, Pembroke Pines, FL (US)

(73) Assignee: JL Audio, Inc., Miramar, FL (US)

( * ) Notice: Subject to any disclaimer, the term of this patent is extended or adjusted under 35 U.S.C. 154(b) by 0 days.

(21) Appl. No.: 15/962,397

(22) Filed: Apr. 25, 2018

(51) Int. Cl.
*H04R 1/02* (2006.01)
*F16B 23/00* (2006.01)

(52) U.S. Cl.
CPC .......... *H04R 1/023* (2013.01); *F16B 23/0023* (2013.01); *H04R 2201/021* (2013.01); *H04R 2400/11* (2013.01)

(58) Field of Classification Search
CPC .............. H04R 1/023; H04R 2201/021; H04R 2400/11
See application file for complete search history.

(56) References Cited

U.S. PATENT DOCUMENTS

| | | | | |
|---|---|---|---|---|
| 4,032,725 A | * | 6/1977 | McGee | H04R 1/025 381/395 |
| 4,196,791 A | * | 4/1980 | Gottlieb | H04R 1/023 181/149 |
| 4,277,653 A | * | 7/1981 | Pawelzick | H04R 1/025 181/150 |
| 4,331,841 A | * | 5/1982 | Castagna | H04R 1/023 381/186 |
| 4,439,643 A | * | 3/1984 | Schweizer | H04R 1/021 181/153 |
| 4,503,292 A | * | 3/1985 | Johnson | H04R 1/023 381/391 |
| 4,887,690 A | * | 12/1989 | Patel | H04R 1/023 181/150 |
| 4,993,511 A | * | 2/1991 | Hiraki | H04R 1/025 181/150 |
| 5,331,119 A | * | 7/1994 | Leger | H04R 1/025 181/150 |
| 2003/0047377 A1 | * | 3/2003 | Proni | H04R 7/20 181/172 |
| 2004/0047487 A1 | * | 3/2004 | Popken | H04R 1/025 381/395 |
| 2005/0213784 A1 | * | 9/2005 | Garretson | H04R 1/023 381/162 |
| 2006/0177088 A1 | * | 8/2006 | Howard | H04R 1/023 381/391 |
| 2007/0025583 A1 | * | 2/2007 | Weil | H04R 1/023 381/391 |
| 2007/0098206 A1 | * | 5/2007 | Ando | H04R 1/023 381/391 |

(Continued)

*Primary Examiner* — Joshua Kaufman
(74) *Attorney, Agent, or Firm* — GrayRobinson, P.A.; Thomas L. Kautz; Donald S. Showalter (57) ABSTRACT

A loudspeaker system comprises a speaker frame and a grill assembly formed of a number of components that can be molded in different colors, removed from the frame for painting or other customization and/or replaced with other grill components in order to vary, as desired, the aesthetic appearance of the loudspeaker system.

15 Claims, 9 Drawing Sheets

(56) References Cited

U.S. PATENT DOCUMENTS

| | | | | |
|---|---|---|---|---|
| 2007/0177754 A1* | 8/2007 | Kemmerer | H04R 1/023 | |
| | | | 381/391 | |
| 2007/0189557 A1* | 8/2007 | Blackmon | H04R 1/345 | |
| | | | 381/182 | |
| 2008/0044053 A1* | 2/2008 | Belanger | H04R 1/023 | |
| | | | 381/391 | |
| 2012/0321121 A1* | 12/2012 | Taylor | H04R 1/023 | |
| | | | 381/391 | |
| 2013/0028463 A1* | 1/2013 | Baker | H04R 1/023 | |
| | | | 381/391 | |
| 2014/0169606 A1* | 6/2014 | Fleischman | H04R 1/023 | |
| | | | 381/334 | |
| 2014/0233786 A1* | 8/2014 | Sumitani | H04R 1/02 | |
| | | | 381/391 | |
| 2015/0043961 A1* | 2/2015 | Suzuki | H04R 1/023 | |
| | | | 403/217 | |
| 2018/0184183 A1* | 6/2018 | Kaplan | H04R 1/023 | |
| 2019/0069078 A1* | 2/2019 | Johnson | H04R 1/345 | |
| 2019/0289389 A1* | 9/2019 | Balistreri | H04R 1/023 | |

* cited by examiner

LOUDSPEAKER SYSTEM WITH MULTI-COMPONENT GRILL ASSEMBLY

FIELD OF THE INVENTION

This invention relates to loudspeakers, and, more particularly, to a loudspeaker system having a grill assembly formed of a number of components each of which can be removed for painting or other customization and/or replaced with other grill components in order to vary, as desired, the aesthetic appearance of the loudspeaker system.

BACKGROUND OF THE INVENTION

Loudspeakers generally comprise a frame, a motor structure, a diaphragm, a lower suspension or spider and a surround or upper suspension. Speakers may be mounted within the interior of an enclosure having a front panel formed with an opening such that a forward-facing surface of the diaphragm aligns with the opening. Alternatively, speakers may be mounted to a baffle that attaches to or is integrally formed as part of a wall, ceiling or the like that defines an enclosed interior area where the speaker may be located.

In order to protect the speaker components from damage, a grill is typically mounted to or formed as a part of the enclosure or baffle. Grills may comprise a screen formed of "soft" material such as fabric or "hard" material such as metal or wood. Grills may be attached directly to the frame of the speaker, to the enclosure that houses the speaker or to the baffle that mounts the speaker.

Known speaker designs of the type described above do not permit customization of the appearance of the speaker or grill, e.g. variation of the color or configuration. Further, in outdoor applications such as on patios or boats, typical speaker grills are not readily replaceable should they sustain damage or become weathered in appearance.

SUMMARY OF THE INVENTION

This invention is directed to a loudspeaker system comprising a frame which mounts a grill assembly formed of a number of components that can be molded in different colors, individually removed for painting or other customization and/or replaced with other grill components in order to vary, as desired, the aesthetic appearance of the loudspeaker system.

The frame may mount a first loudspeaker such as a woofer. In the presently preferred embodiment, one end of the frame is formed with a seat which mounts the grill assembly having a tweeter mount, a grill tray and a grill. The tweeter mount has a centrally located core adapted to mount at least one second loudspeaker such as a tweeter. The grill tray overlies the tweeter mount, and the grill is positioned over the grill tray. The tweeter mount and grill tray are formed with bores which align with bores in the seat of the speaker frame. Self-tapping fasteners may be inserted through such aligning bores and tightened down in order to removably connect the tweeter component and grill tray to the frame. Additionally, the tweeter mount, grill tray, grill and seat are formed with aligning bores through which fasteners may be inserted in order to mount the entire loudspeaker system to an enclosure or to a baffle, and to secure the grill in place overlying the other grill assembly components.

The above-described construction permits variation of the aesthetic appearance of the speaker, and easy replacement of damaged or weathered parts. Each component of the grill assembly may be molded in any number of colors so that different color combinations may be used, as desired. Alternatively, one or more of the grill assembly components may be removed, custom painted with a particular color, and then replaced to achieve a desired cosmetic effect. Additionally, because the tweeter component, grill tray and grill are all removably mounted to the speaker frame and/or to an enclosure or baffle, each can be easily removed and replaced with new parts in the event of damage or weathering.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE PREFERRED EMBODIMENT

Figure 1:
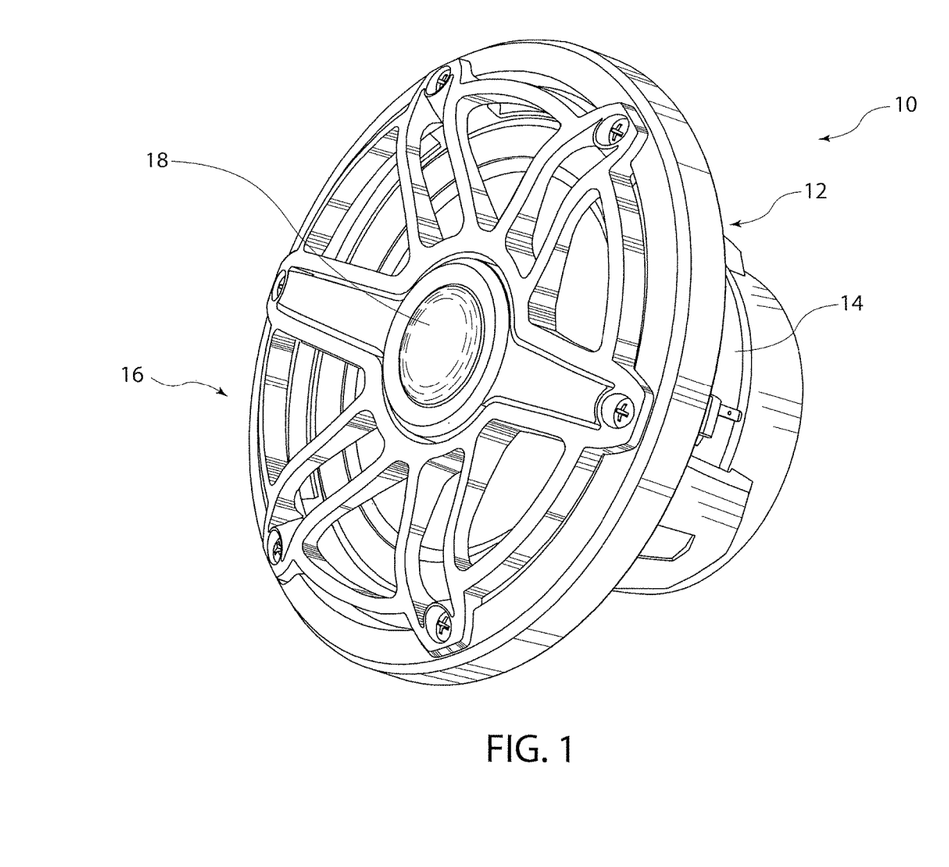
FIG. 1 is a perspective view of the loudspeaker system of this invention illustrating the grill assembly herein mounted to a speaker frame.
Figure 2:
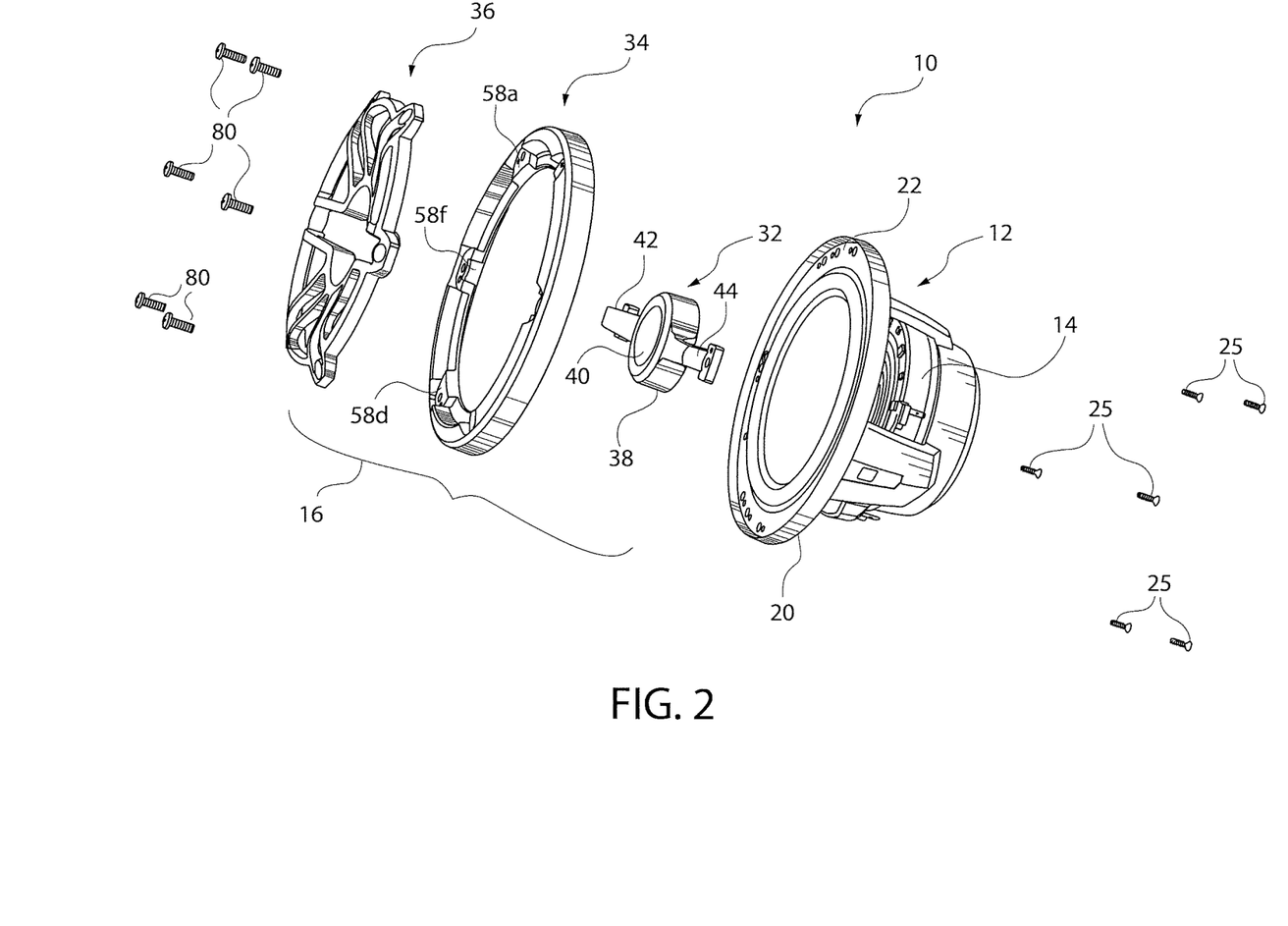
FIG. 2 is an exploded, perspective view of the loudspeaker system shown in FIG. 1.

Referring initially to FIGS. 1 and 2, the loudspeaker system 10 of this invention comprises a frame 12, a first loudspeaker 14 mounted to the frame 12, a multi-component grill assembly 16 and a second speaker 18 mounted to one component of the grill assembly 16. Throughout the following description, the terms "top," "bottom," "upper" and "lower" are meant to refer to directions and/or locations with the loudspeaker system 10 in the orientation shown in the Figs. The terms "inner" and "outer" refer to a radial relationship of parts or structure beginning at the longitudinal axis of the loudspeaker system 10 which, for purposes of this discussion, is considered to pass through the center of the grill assembly 16.

Figure 3:
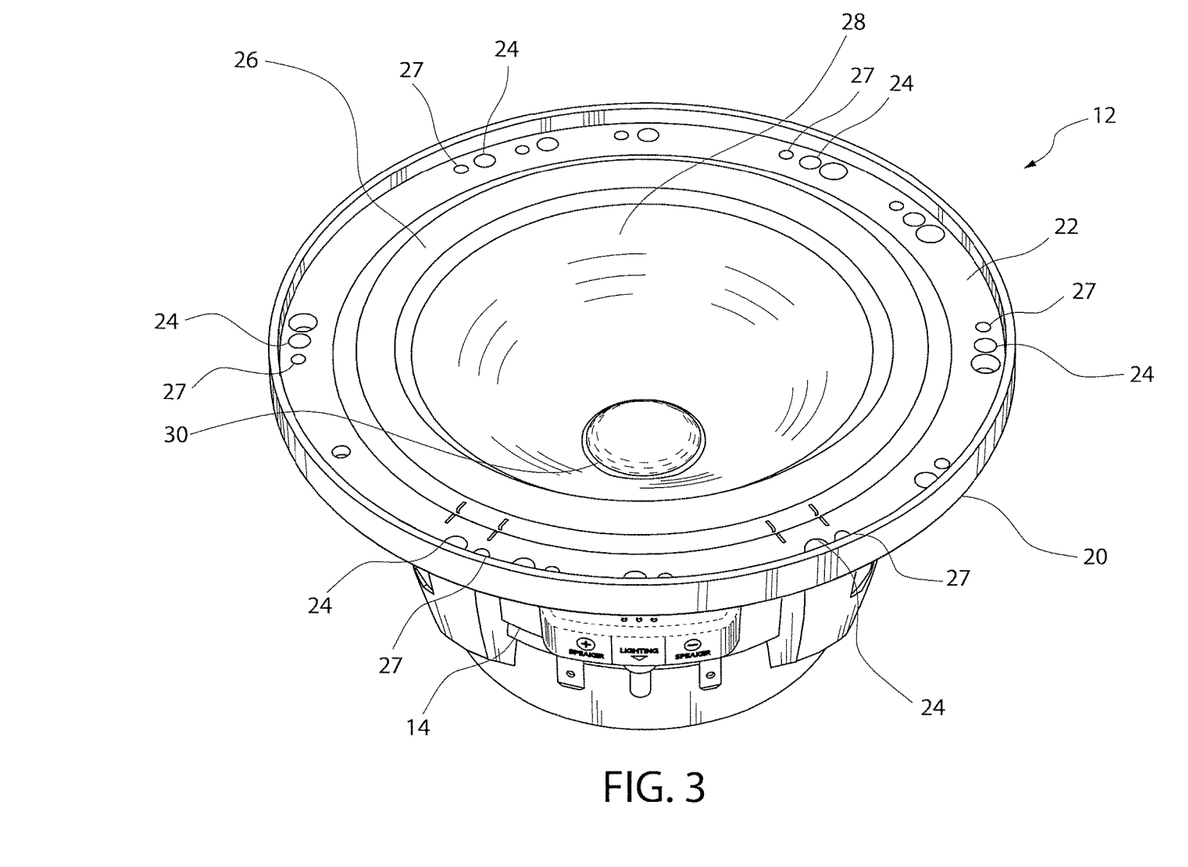
FIG. 3 is a perspective view of the speaker frame with a first loudspeaker mounted thereto.

Except as set forth below, details of the frame 12, first speaker 14 and second speaker 18 form no part of this invention and are not described herein. For purposes of the present discussion, the frame 12 may be formed of molded plastic with an upper end 20 having a seat 22. The seat 22 is formed with a number of circumferentially spaced first bores 24 and second bores 27. The first speaker 14 may be a woofer, mid-range or other loudspeaker depending on the requirements of a particular application. It may be mounted in any conventional manner to the frame 12, such as by fasteners or adhesive. As seen in FIGS. 2 and 3, the first speaker 14 is mounted to the frame 12 so that its upper suspension 26, diaphragm 28 and dust cap 30 are visible. Preferably, each of these components of the first speaker 14 is formed of a material that is resistant to moisture, debris and other contaminants that may be present in an outdoor environment.

Figure 4:
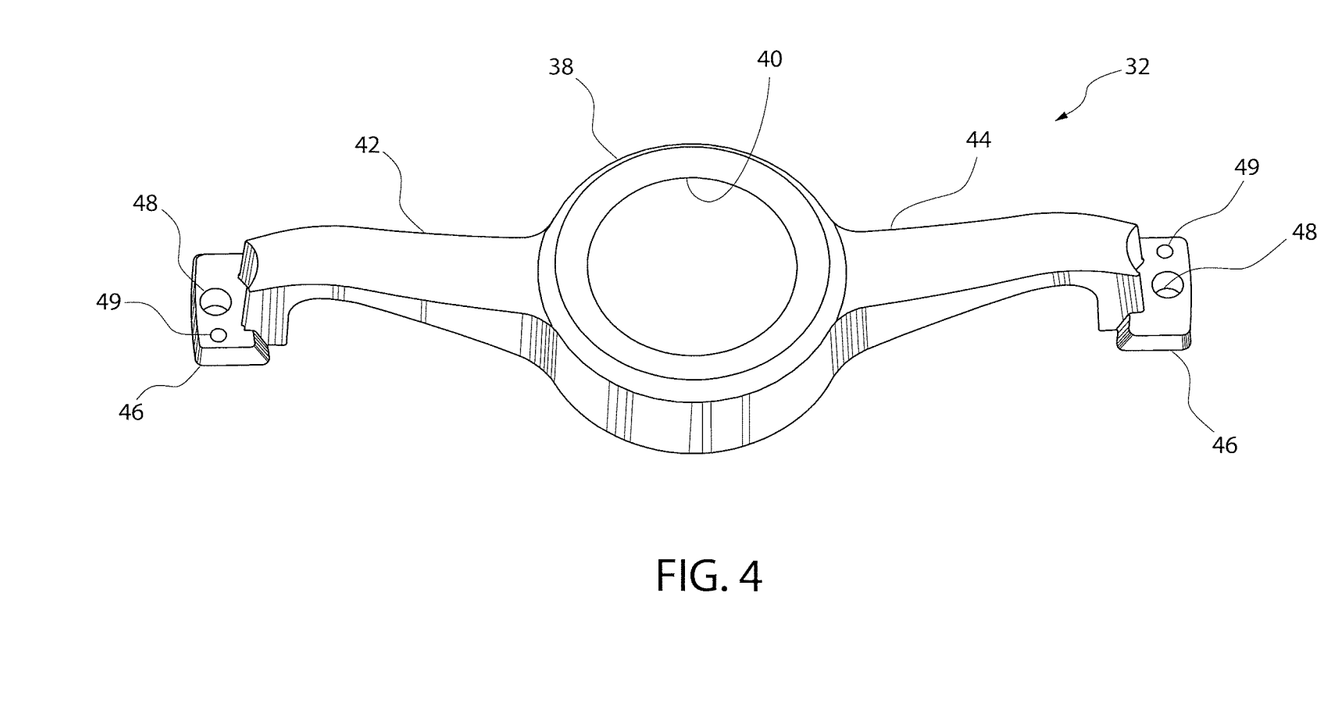
FIG. 4 is a perspective view of the tweeter mount of this invention which mounts a second speaker as depicted in FIG. 1.

The grill assembly 16 comprises a tweeter mount 32, a grill tray 34 and a grill 36, each of which is described separately below. As best seen in FIG. 4, the tweeter mount 32 includes a core 38 having a central opening 40 which mounts the at least one second speaker 18, preferably using adhesive. In one embodiment, the second speaker 18 is a tweeter capable of reproducing sound in higher range frequencies compared to the first speaker 14. Alternatively, one or more other speakers, such as a tweeter and a mid-range speaker (not shown), may also be secured to the tweeter mount 32. Two mounting arms 42 and 44 extend radially outwardly from the core 38 and each has a foot 46 at an outer end formed with a first arm bore 48 and a second arm bore 49.

Figure 5:
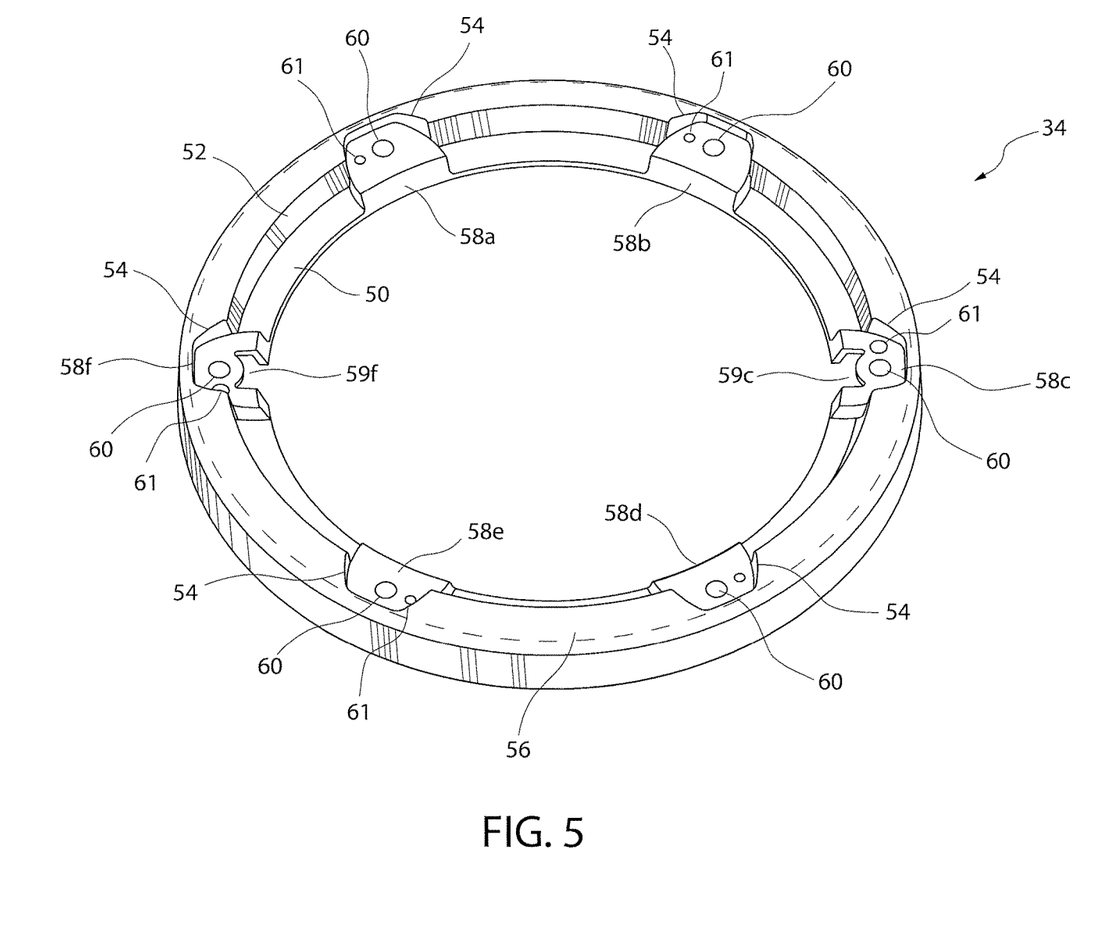
FIG. 5 is a perspective view of the grill tray herein.

Referring to FIGS. 2 and 5, the grill tray 34 is a donut-shaped plate defining an inner ring 50 and an outer ring 52. The outer ring 52 is formed with a number of circumferentially spaced recesses 54 and a planar upper surface 56. Each of a number of mounting tabs 58a-58f extend from the inner ring 50 into one of the recesses in the outer ring 52. Two of the mounting tabs, 58c and 58f, are formed with inwardly facing notches 59c and 59f, respectively, for purposes to become apparent below. The top of each mounting tab 58 is spaced below the upper surface 56 of the outer ring 52. Additionally, each of the mounting tabs 58a-58f is formed with a first tab bore 60 and a second tab bore 61.

Figure 6:
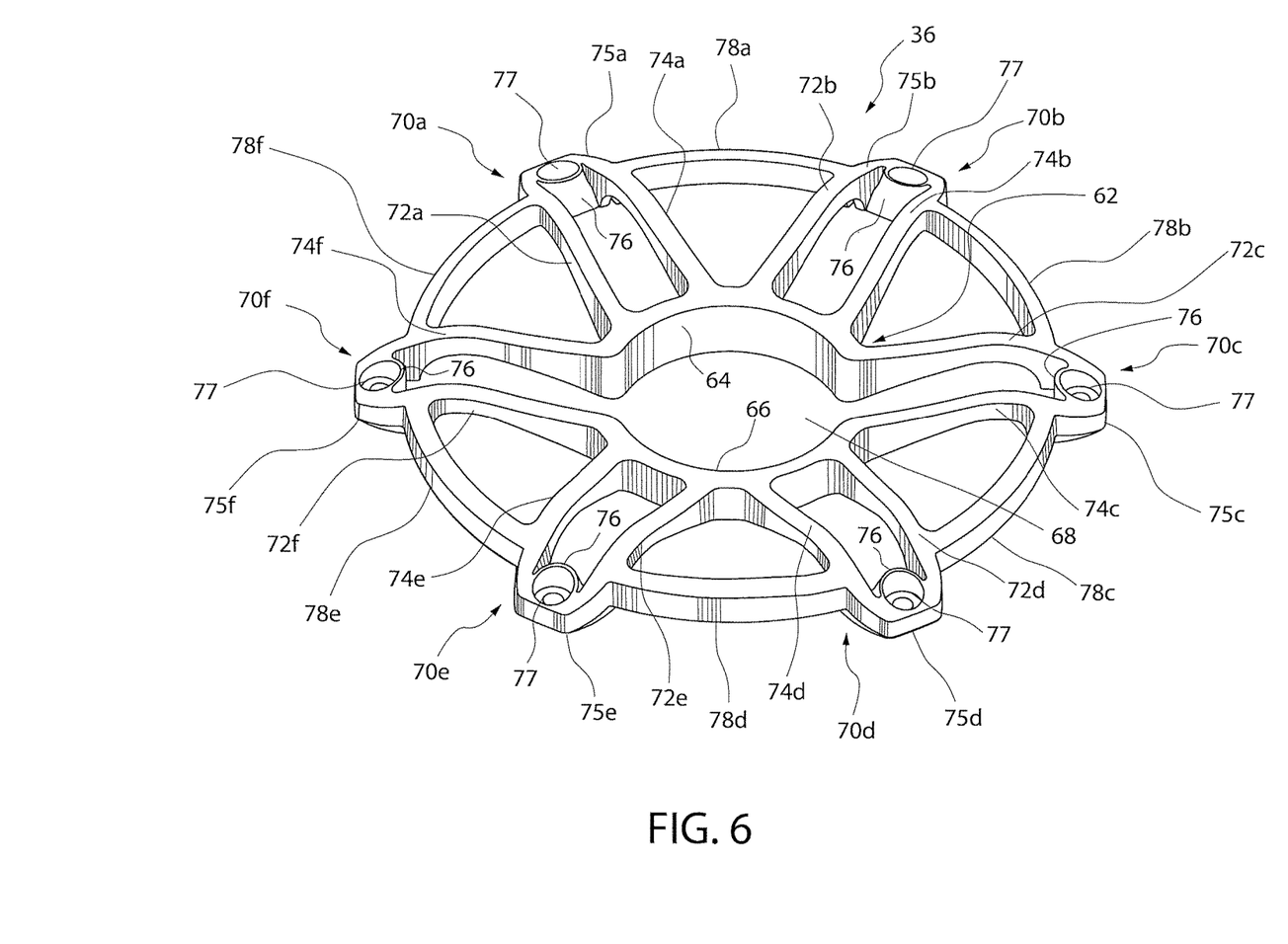
FIG. 6 is a perspective view of the grill of this invention.
Figure 7:
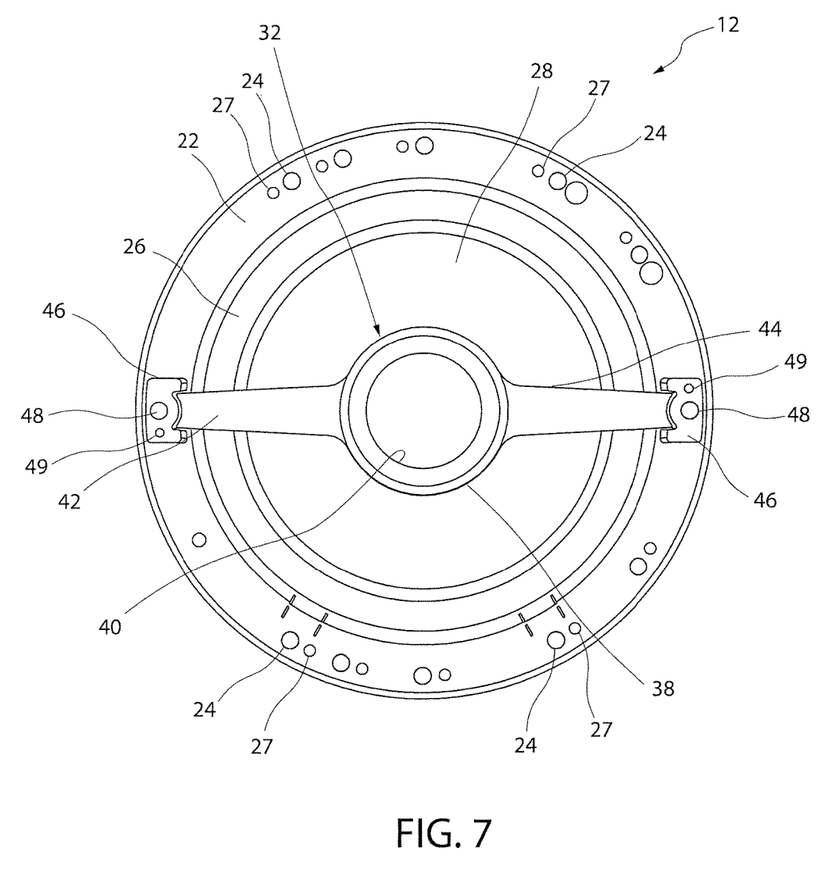
FIG. 7 is a plan view of a first step of the assembly operation for the grill assembly in which the tweeter mount is placed onto the speaker frame.

The grill 36 comprises a central hub 62 formed with a first portion 64 separated from a second portion 66 which collectively define a central opening 68. See FIGS. 2 and 6. A number of spokes 70a-70f extend radially outwardly from the hub 62, each having spaced legs 72a-72f and 74a-74f which are joined at an inner end thereof to one of the first and second portions 64, 66 of hub 62 and meet at respective outer ends 75a-75f thereof to mount a socket 76 having a socket bore 77. More specifically, the inner end of legs 72a and 74a of spoke 70a and the inner end of legs 72b and 74b of spoke 70b are joined to the first portion 64 of hub 62. Similarly, the inner end of the legs 72d and 74d of spoke 70d and the inner end of legs 72e and 74e of spoke 70e are joined to the second portion 66 of hub 62. The other two spokes, 70c and 70f, connect to both the first and second portions 64 and 66. As seen in FIG. 6, the leg 72c of spoke 70c connects to the first portion 64, and its leg 74c connects to the second portion 66. The leg 74f of spoke 70f connects to the first portion 64, and its leg 72f connects to the second portion 66. The outer ends 75a-f of adjacent spokes 70a-70f are connected by ring segments 78a-78f. Ring segment 78a extends between spokes 70a and 70b, ring segment 78b extends between spokes 70b and 70c, ring segment 78c extends between spokes 70c and 70d, ring segment 78d extends between spokes 70d and 70e, ring segment 78e extends between spokes 70e and 70f, and, ring segment 78f extends between spokes 70f and 70a.

Referring to FIGS. 2 and 7-9, the manner in which the grill assembly 16 is interconnected and mounted to the frame 12 is illustrated. Initially, the two mounting arms 42, 44 of the tweeter mount 32 are positioned relative to the seat 22 of the speaker frame 22 so that the foot 46 of each arm 42, 44 resides in the seat 22. The first arm bore 48 in each foot 46 of the arms 42, 44 aligns with one of the first bores 24 in the seat 22, and the second arm bore 49 of each arm 42, 44 aligns with one of the second bores 27 in the seat 22.

Figure 8:
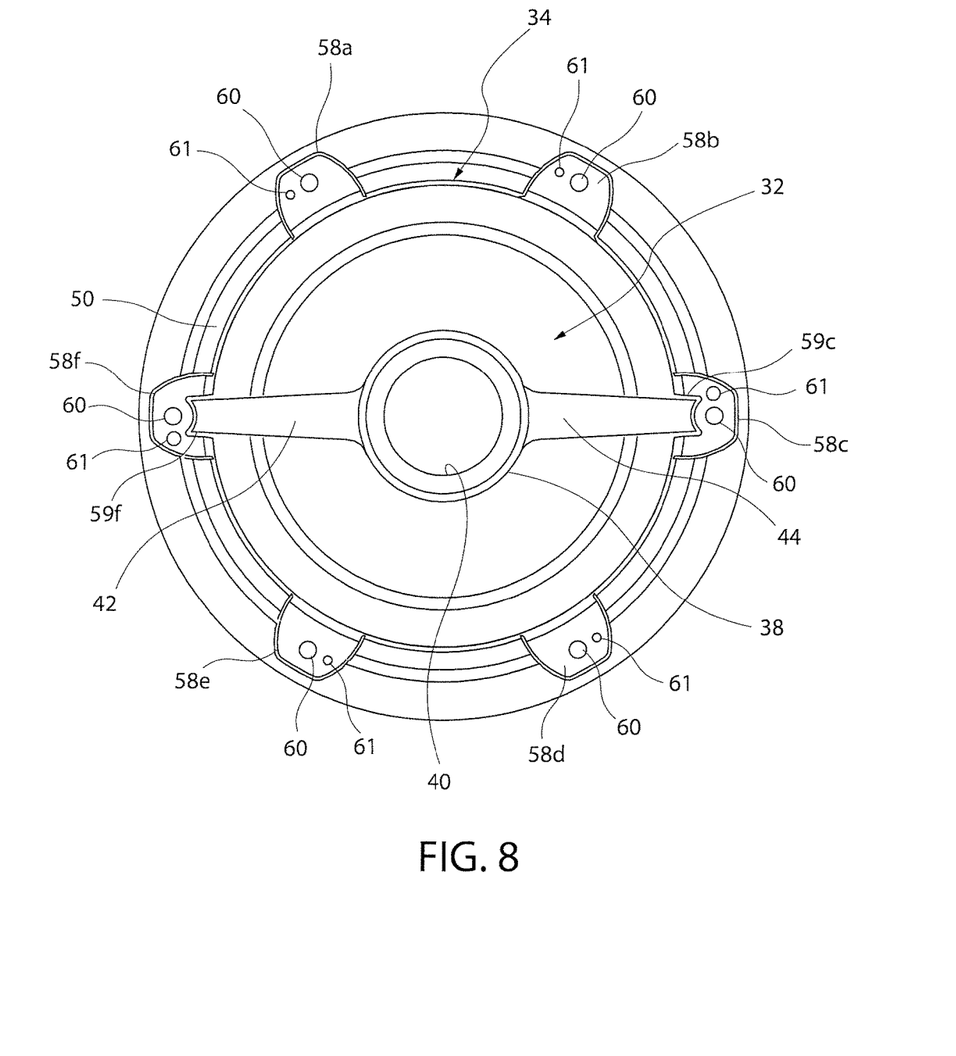
FIG. 8 is the next step in the assembly operation wherein the grill tray is placed over the tweeter mount and speaker frame.

The next step in the assembly operation is to locate the grill tray 34 in position relative to the tweeter mount 32 and the frame seat 22. As shown in FIG. 8, the inner ring 50 of the grill tray 34 is placed within the seat 22 such that the notch 59f formed in mounting tab 58f receives the mounting arm 42 of tweeter mount 32, and the notch 59c of mounting tab 58c receives the mounting arm 44. In this position, the first tab bore 60 in each mounting tab 58a-f aligns with one of the first bores 24 in seat 22, and further, the first tab bore 60 in mounting tabs 58c and 58f align with the first arm bores 48 in mounting arms 42, 44, respectively, of the tweeter mount 32, Additionally, the second tab bore 61 in each mounting tab 58a-f aligns with one of the second bores 27 in seat 22, and the second tab bore 61 in each of the mounting tabs 58c and 58f aligns with the second arm bore 49 in mounting arms 44, 42, respectively, of the tweeter mount 32.

As best seen in FIGS. 2 and 8, with the tweeter mount 32 and grill tray 34 in the position noted above, self-tapping screws 25 may be employed to connect such components to the frame 12. Specifically, one of two self-tapping screws 25 is inserted through each of the second bores 27 in seat 22, from the back side of the frame 12 as viewed in FIG. 2, into one of the second arm bores 49 formed in the foot 46 of each mounting arm 42, 44 and tightened down. Each of the other four self-tapping screws 25 shown in FIG. 2 is inserted through one of the second bores 27 in seat 22, also from the back side of frame 12, into one of the second tab bores 61 formed in mounting tabs 58a, 58b, 58d and 58e of the grill tray 34 and tightened down. This step in the assembly operation thus releasably connects both the tweeter mount 32 and grill tray 34 to the frame 12.

Figure 9:
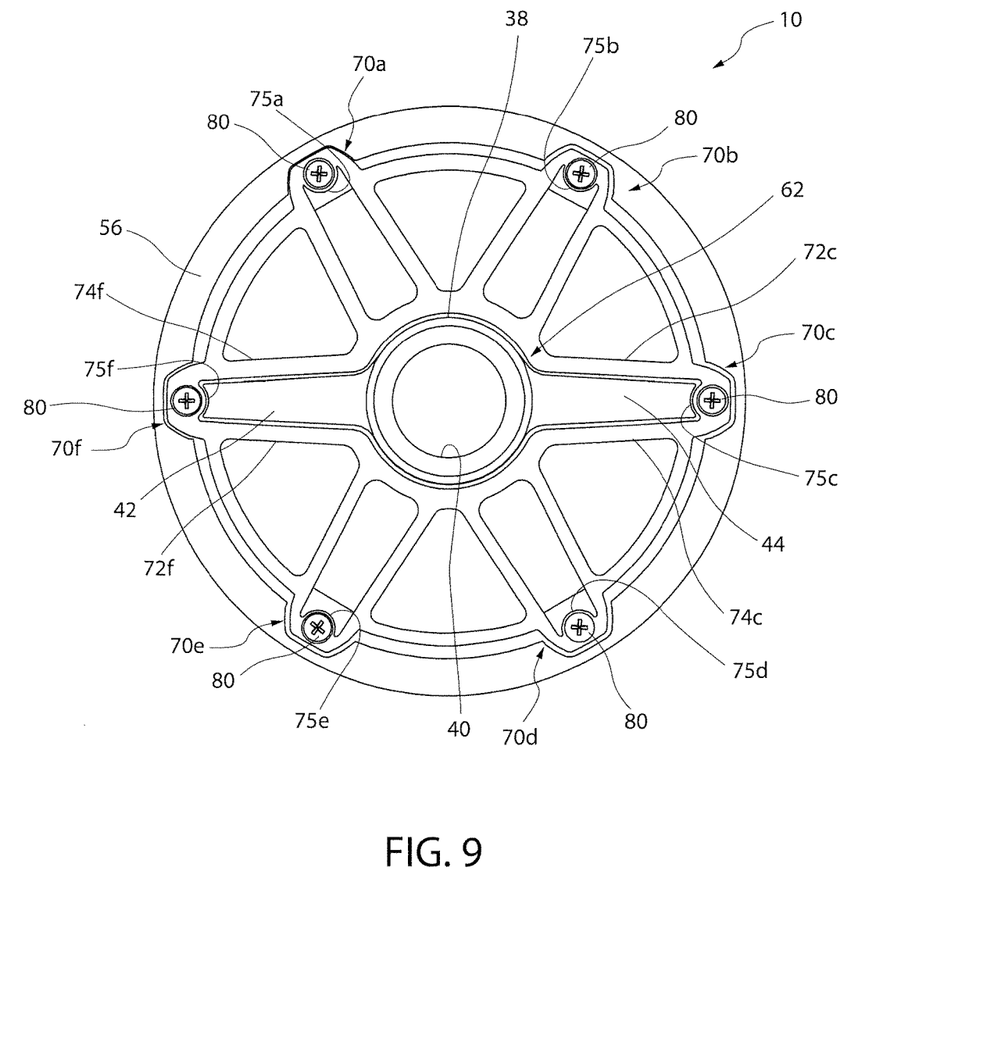
FIG. 9 is the next step after that shown in FIG. 8 in which the grill is placed over the grill tray and tweet mount.

Referring now to FIGS. 1 and 9, the last of the grill assembly 16 components, grill 36, is then located relative to the tweeter mount 32 such that the mounting arm 42 fits within the space between the legs 72f and 74f of the spoke 70f, the mounting arm 44 fits within the space between the legs 72c and 74c of the spoke 70c, and, the core 38 of tweeter mount 32 is received within the hub 62 of grill 36. In this position, the socket 76 of each spoke 70a-f overlies mounting tabs 58a-f, respectively, of the grill tray 34. Each of the socket bores 77 in the sockets 76 of the grill 26 aligns with one of the first tab bores 60 in the grill tray 34, and aligns with one of the first bores 24 in the seat 22 of frame 12. Additionally, the socket bore 77 of spoke 70f aligns with the first arm bore 48 in mounting arm 42, and the socket bore 77 of spoke 70c aligns with the first arm bore 48 in the mounting arm 44 of tweeter mount 32. One of six self-tapping screws 80 may be inserted through each socket bore 77 and through the aligning first tab bores 60 in the grill tray 34, two of which screws 80 also pass through the first arm bores 48 in the mounting arms 42, 44 of tweeter mount 32, and then all six screws 80 pass through one of the first bores 24 in the seat 22 of frame 24 and extend outwardly therefrom. It is contemplated that the loudspeaker system 10 may be received within a speaker enclosure or inside of an interior space formed by a baffle or the like (not shown) to protect the first speaker 12 from exposure to contaminants that may be present in an outdoor environment. To that end, the screws 80 extending outwardly from the seat 22 of the speaker frame 12 may be connected to such speaker enclosure or baffle in order to mount the loudspeaker system 10 thereto, and to secure the grill 36 in place on the frame 12.

It can be appreciated from the foregoing discussion that the multi-component construction of the grill assembly 16 of this invention allows for easy and efficient assembly and disassembly. Any one of the tweeter mount 32, grill tray 34 and grill 36 may be removed and replaced by other(s) of different color, or removed for painting a custom color and then replaced, and/or removed and replaced in the event of damage or weathering. Essentially any color combination can be achieved to customize the grill assembly 16 in order to realize the desired aesthetic appearance.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A loudspeaker system, comprising:
   a frame formed with a seat having a number of first seat bores and a number of second seat bores;
   a first loudspeaker mounted to said frame;
   a speaker mount having spaced mounting arms each being formed with a first arm bore and a second arm bore, said speaker mount being positioned to overlie said seat so that each one of said first arm bores aligns with one of said first seat bores and each one of said second arm bores aligns with one of said second seat bores;
   a second loudspeaker mounted to said speaker mount;
   a grill tray having a number of mounting tabs each formed with a first tab bore and a second tab bore, said grill tray being positioned to overlie said speaker mount and said seat such that at least some of said first and second tab bores align with respective first and second arm bores in said speaker mount and such that each one of said first and second tab bores aligns with respective first and second seat bores in said seat;
   a number of first fasteners inserted into said second seat bores in said seat and aligning second arm bores in said speaker mount to connect said speaker mount to said seat, a number of first fasteners inserted into said second seat bores in said seat and aligning second tab bores in said grill tray to connect said grill tray to said seat;
   a grill including a number of spaced spokes each having an end formed with a socket bore, said grill being positioned to overlie said grill tray such that each of said socket bores aligns with one of said first tab bores in said grill tray and one of said first seat bores in said seat, at least some of said socket bores aligning with each one of said first arm bores in said speaker mount;
   a number of second fasteners inserted through one of said aligning socket bores, first tab bores, first arm bores and first seat bores, said second fasteners being adapted to mount said loudspeaker system to a speaker enclosure or within an interior of a baffle;
   said speaker mount, said grill tray and said grill forming a stacked construction wherein each one is releasably mounted to said frame in overlying relationship with one another and may be individually removed from said frame for separate customization or replacement.

2. The loudspeaker system of claim 1 in which said grill tray is formed with an inner ring and an outer ring, said mounting tabs extending between said inner and outer rings.

3. The loudspeaker system of claim 2 in which said outer ring is formed with a first surface, each of said mounting tabs being spaced from said first surface of said outer ring.

4. The loudspeaker system of claim 3 in which a recess is formed in said outer ring at said first surface where each mounting tab is located.

5. The loudspeaker system of claim 2 in which said grill is formed with a hub connected to said spaced spokes, each of said spokes having an inner end joined to said hub and an outer end formed with one of said socket bores.

6. The loudspeaker system of claim 5 in which said hub includes a first portion and a second portion which define a central opening, said first portion being joined to a first spoke and to a second spoke, said second portion being joined to a third spoke and to a fourth spoke, each of said first and second portions being joined to a fifth spoke and to a sixth spoke.

7. The loudspeaker system of claim 5 in which adjacent spokes are connected to one another by a ring segment.

8. A loudspeaker system, comprising:
   a frame;
   a first loudspeaker mounted to said frame;
   a grill assembly, comprising:
     (a) a speaker mount releasably connected to said frame;
     (b) a grill tray releasably connected to said frame in position to overlie said speaker mount;
     (c) a grill releasably connected to said frame in position to overlie said grill tray;
   a second loudspeaker mounted to said speaker mount;
   said speaker mount, said grill tray and said grill forming a stacked construction wherein each one is releasably connected to said frame in overlying relationship with one another and may be individually removed from said frame for separate customization or replacement.

9. The loudspeaker system of claim 8 in which said speaker mount is formed with a central core connected to at least two spaced arms, each of said arms being releasably connected to said seat.

10. The loudspeaker system of claim 9 in which said grill tray is formed with an inner ring, an outer ring and a number of circumferentially spaced mounting tabs extending between said inner and outer rings, said grill tray being positioned relative to said speaker mount so that each of two of said mounting tabs aligns with one of said arms.

11. The loudspeaker system of claim 10 in which said outer ring is formed with a first surface, each of said mounting tabs being spaced from said first surface.

12. The loudspeaker system of claim 10 in which a recess is formed in said outer ring where each mounting tab is located.

13. The loudspeaker system of claim 10 in which said grill is formed with a hub and a number of circumferentially spaced spokes each extending outwardly from said hub, each of said spokes having an inner end joined to said hub and an outer end formed with a socket bore, said grill being positioned relative to said grill tray so that each of said socket bores in said outer end of said spokes aligns with one of said mounting tabs of said grill tray.

14. The loudspeaker system of claim 13 in which said hub includes a first portion and a second portion which define a central opening, said first portion being joined to a first spoke and to a second spoke, said second portion being joined to a third spoke and to a fourth spoke, each of said first and second portions being joined to a fifth spoke and to a sixth spoke.

15. The loudspeaker system of claim 13 in which adjacent spokes are connected to one another by a ring segment.

* * * * *